United States Patent [19]

Mink et al.

[11] 3,944,519

[45] Mar. 16, 1976

[54] CURABLE ORGANOPOLYSILOXANE COMPOSITIONS

[75] Inventors: Alan E. Mink; Darrell D. Mitchell, both of Midland, Mich.

[73] Assignee: Dow Corning Corporation, Midland, Mich.

[22] Filed: Mar. 13, 1975

[21] Appl. No.: 558,026

[52] U.S. Cl. 260/46.5 UA; 260/448.2 H; 260/448.2 Q
[51] Int. Cl.² .......................................... C08L 83/04
[58] Field of Search 260/46.5 UA, 448.2 Q, 448.2 H

[56] References Cited
UNITED STATES PATENTS 3,703,562  11/1972  Antonen et al. ........ 260/46.5 UA X

*Primary Examiner*—Lewis T. Jacobs
*Attorney, Agent, or Firm*—Norman E. Lewis

[57] ABSTRACT

Platinum-catalyzed mixtures of $H(CH_3)_2SiO-(C_6H_5)_2SiOSi(CH)_2H$ and monophenylsiloxy/dimethylvinylsiloxy copolymer cure to give a strong flexible resin having thermal shock resistance.

5 Claims, No Drawings

CURABLE ORGANOPOLYSILOXANE COMPOSITIONS

BACKGROUND OF THE INVENTION

The present invention relates to curable organopolysiloxane compositions. In one aspect, the present invention relates to an improved encapsulating resin.

Organosiloxane resins in which the substituent organic groups are methyl, phenyl, vinyl and/or other organic groups are well known. These resins are cured by a variety of mechanisms, such as by cross-linking through a vinyl group or by the platinum catalyzed reaction of $\equiv$SiH groups with alkenyl radicals, to form hard infusible materials. The properties of these organosiloxane resins, such as toughness, high dielectric capacity, resistance to thermal decomposition and retention of strength at high temperatures, make them useful in many different applications.

Certain applications, such as encapsulating electrical components and coating of coils for electric motors, provide a very severe environment for the use of presently available resins. The resins must be strong, yet flexible and must retain their strength under repeated thermal shock. Also, the resin must cure without the evolution of volatiles, such as solvents or water, in order to avoid the formation of bubbles and/or voids in the coating. A further requirement is that heat sensitive electronic devices require encapsulation with compositions which cure at relatively low temperature.

Presently available silicone resins exhibit some of the properties, but none have the desired combination of strength, flexibility, thermal shock resistance and low temperature cure.

Thus, it is an object of the present invention to provide an improved curable organopolysiloxane composition.

It is another object of the invention to provide an encapsulating resin which is readily cured at low temperatures to form a strong, flexible coating having high thermal shock resistance.

These and other objects of the invention will be apparent to one skilled in the art upon consideration of the following disclosure and appended claims.

DETAILED DESCRIPTION OF THE INVENTION

In accordance with the present invention, there is provided a curable composition consisting essentially of (a) an organopolysiloxane containing from 75 to 85 mol percent $C_6H_5SiO_{3/2}$ units and 15 to 25 mol percent $CH_2\!=\!CH(CH_3)_2SiO_{1/2}$ units, said organopolysiloxane having an average of at least 8 silicon atoms per molecule; (b) an organopolysiloxane of the formula

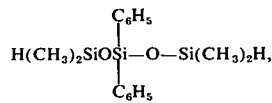

said organopolysiloxane being present in the mixture in an amount sufficient to provide 0.9 to 1.1 mol of $\equiv$SiH per mol of vinyl substituent present in siloxane (a); and (c) a platinum catalyst present in an amount sufficient to catalyze the addition reaction of $\equiv$SiH with $CH_2\!=\!CHSi\equiv$.

In the described composition, organopolysiloxane (a) is the base resin, the composition of which is critical to obtaining the desired combination of physical properties. The monophenylsiloxy content of 75 to 85 mol percent and dimethylvinylsiloxy content of 15 to 25 mol percent in the copolymer is essential to obtaining a high strength flexible cured material which exhibits thermal shock resistance. In a preferred embodiment, the copolymer contains about 75 mol percent $C_6H_5SiO_{3/2}$ units and about 25 mol percent $CH_2\!=\!CH(CH_3)_2SiO_{1/2}$ units. Of course, the vinyl-functional siloxy units act as crosslinking sites in the resins.

The base resin is readily prepared by hydrolysis and condensation of the corresponding chlorosilanes. Conventional techniques of hydrolysis and condensation can be utilized. Although there is no upper limit on the degree polymerization of resin (a), a lower limit of at least eight silicon atoms per molecule is necessary to provide physical strength in the cured composition. The copolymeric siloxane (a) is a solid which is soluble in the low viscosity liquid siloxane (b).

The hydrogenfunctional siloxane (b), which provides crosslinking of the composition is a specific polymer of the formula

This polymer is a known crosslinker (see U.S. Pat. No. 2,915,497) and, when utilized in combination with the described base resin, provides the cured composition with the unique combination of physical properties described herein. The siloxane (b) has a viscosity of about 5 cs. at 25°C. and acts as a diluent for resin (a) to provide mixtures having a viscosity of from about 3000 to greater than 200,000 cs. at 25°C. The amount of hydrogen-functional siloxane (b) in the curable composition will vary with the amount of resin (a) and with the vinyl content of the resin, but in all cases there is sufficient siloxane (b) present to provide from 0.9 to 1.1 mol of $\equiv$SiH per mol of vinyl substituents in the composition. To obtain optimum crosslinking efficiency it is preferred that the ratio of $\equiv$SiH to vinyl substituents be about 1:1.

The platinum catalyst (c) can be any of the known forms ranging from platinum metal to platinum deposited on carriers, such as silica gel or powdered charcoal, to platinic chloride, salts of platinum and chloroplatinic acid. Any of these forms will function as a catalyst in the curable compositions of the invention. Chloroplatinic acid, either as the commonly available hexahydrate or the anhydrous acid, is a preferred catalyst because of its easy dispersibility in the siloxanes and its lack of effect on the color of the curable compositions. Additional platinum compounds having utility as catalysts include

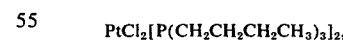

platinum bormides, a complex of platinous halide and an olefin such as ethylene, propylene, butylene, cyclohexane and styrene, $Pt(CH_3CN)_2Cl$, $[Pt(CH_3CN)_2(CH_3)_4]Cl_2$, $Pt(NH_3)_2Cl_2$, $K[PtCl_3CH_2CH_2CH_2OH]$, $PtBr_2(C_2H_4)_2$, $K[PtBr_3(C_2H_4)]$, $PtCl_2(C_2H_4)$, $(CH_3)_2C\!=\!CH_2.PtCl_2$, $H_2Pt(CN)_4.5H_2O$, $H[PtCl_3(CH_3CN)]$, $Pt(NH_3)_2(CNS)_2$, $[Pt(NH_3)_4].[PtCl_4]$, $[PtCl_2[P(CH_2CH_3)_3]_2$, $PtCl_2.PCl_3$, $PtCl_2.[P(OCH_2CH_3)_3]_2$, $Pt(OOCH_2SCH_2CH_3)_2$, $Pt(CN)_3$, $(CH_3)_4Pt$, $(CH_3)_3Pt\!-\!Pt(CH_3)_3$,

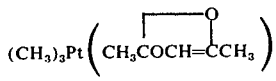

PtCl$_2$CO and PtBr$_2$CO.

There should be at least 0.1 part by weight platinum per million parts by weight of the combined total weight of (a), (b) and (c). However, since impurities in the system may readily poison the small quantity of catalyst it is preferred to employ from 1 to 20 parts per million of platinum. A greater amount of platinum does not effect the reaction but economic considerations suggest usage within the mentioned limits.

When the curable compositions of the invention are utilized as coatings for electrical devices, it is desirable that the compositions cure without the evolution of volatiles which would form voids or bubbles in the coating. Voids can be caused by the reaction of $\equiv$SiH with $\equiv$SiOH which is often present in the base resin (a). When necessary, the base resin (a) can be reacted with alkaline condensation catalysts, such as sodium hydroxide, in a solvent to reduce the hydroxyl content to an acceptable level, such as less than one percent as specified in the preferred embodiment of the invention.

Heat stable fillers can be incorporated in the curable compositions of the invention. Suitable fillers include glass fibers, finely divided silica, crushed quartz, powdered glass, asbestos, talc, carbon black, iron oxide, titanium dioxide, magnesium oxide and the like. Other additives such as pigments, dyes, oxidation inhibitors and release agents can also be utilized.

The curable compositions can be employed in any conventional manner for coating, casting or impregnating. The siloxane resin (a), the hydrogen-functional fluid (b) and the platinum catalyst (c) are mixed together with any desired filler and additives and the resulting mixture is fabricated into the desired form, followed by curing at elevated temperatures, for example, 100°–125°C. In some instances, it may be desirable to post cure at higher temperatures, for example 200°C., to improve physical properties.

The described compositions are particularly useful for impregnating and encapsulating electrical equipment, for coating electrical conductors and for use as protective coatings on metals and other substrates.

The following example is intended as illustrative and should not be construed as limiting the invention delineated in the claims.

EXAMPLE

Base resins containing various amounts of monophenylsiloxy and dimethylvinylsiloxy units were prepared by hydrolysis of the corresponding chlorosilanes, followed by equilibration in the presence of a base, neutralization, and stripping of any volatiles. The silicon-hydride crosslinker, [H(CH$_3$)$_2$SiO]$_2$Si(C$_6$H$_5$)$_2$ was also prepared by hydrolysis of the corresponding chlorosilanes, followed by acid equilibration, neutralization and stripping. Sufficient crosslinker was added to each of the different resins to provide 1.0 mol of $\equiv$SiH per mol of $\equiv$SiCH=CH$_2$ in the composition. A platinum catalyst, [(CH$_3$)$_3$P]$_2$PtCl$_2$ was added in amounts sufficient to provide 10 ppm platinum in each composition.

The compositions were fluid, varying in viscosity. After casting, samples were cured at 100°C. for 16 hours. Portions of the resin were utilized to prepare samples for thermal shock testing. A small amount (11 grams) catalyzed composition was placed in a 2-inch diameter aluminum dish, de-aired and gelled to the point of having the strength to support a steel washer. The washer (1 inch-O.D., 7/16 inch-I.D., 1/16 inch thick and weighing 6.6 grams) was placed in the center of the dish atop the gel and an additional 14 grams of the composition was poured in the dish to provide complete encapsulation of the washer. The samples were cured in an air-circulating oven at 100°C. for 16 hours, allowed to cool to room temperature and removed from the dishes. Fracture temperature of the cured samples was determined by placing the encapsulated washer in a dry ice bath, the rate of cooling being followed by positioning a thermometer directly above the sample. The fracture temperature was recorded upon observation of cracking in the cured resin.

The physical properties including fracture temperature of the various cured compositions are listed below:

TABLE I

| Composition of Base Resin | 82 mol% $\phi$SiO$_{3/2}$ 18 mol% (CH$_3$)$_2$ViSiO$_{1/2}$ | 75 mol% $\phi$SiO$_{3/2}$ 25 mol% (CH$_3$)$_2$ViSiO$_{1/2}$ | 71 mol% $\phi$SiO$_{3/2}$ 29 mol% (CH$_3$)$_2$ViSiO$_{1/2}$ |
|---|---|---|---|
| Viscosity of Catalyzed Mixture (cs. at 25°C.) | ~200,000 | 3300 | 1800 |
| Hardness (Durometer-Shore D) | 70 | 65 | 50 |
| Flex Strength (psi) | 4825 | 4273 | 419 |
| Tangent Modulus 10$^5$ (psi) | 1.24 | 0.96 | 0.019 |
| Fracture Temperature (°C) | −30 | −45 | −57 |

These data demonstrate that the composition of the base resin are critical to obtain the combination of high strength, hardness and low fracture temperatures. The resin containing 71 mol% $\phi$SiO$_{3/2}$ units is outside the scope of the present invention and while the resin does exhibit very good thermal shock resistance, the material has virtually no strength.

As a further comparison, the base resin containing 75 mol% $\phi$SiO$_{3/2}$ and 25 mol% (CH$_3$)$_2$CH$_2$=CHSiO$_{1/2}$ was utilized in combination with other $\equiv$SiH functional crosslinkers. A first composition contained sufficient hydrogen-functional copolymer of 35 mol% $\phi_2$SiO, 55 mol% (CH$_3$)HSiO and 10 mol% (CH$_3$)$_3$SiO$_{1/2}$ to provide 1 mol of $\equiv$SiH per mol of CH$_2$=CHSi$\equiv$ present in the base resin and was catalyzed with sufficient chloroplatinic acid to provide about 10 ppm Pt in the composition. Samples were cured for 16 hours at 150°C. The cured resin exhibited very high flex strength (~7000 psi) but the thermal shock samples cracked when removed from the 150°C. oven. A second composition, containing a mixture of

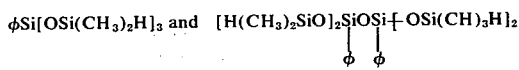

as the crosslinker, was prepared in the same manner. After curing for 16 hours at 150°C., the material exhibited high flex strength (~8000 psi) but again the thermal shock resistance was nil; the fracture temperature being 150°C.

It is apparent that only those compositions based on the defined base resin and containing the [H(CH$_3$)$_2$SiO]SiØ$_2$ crosslinker have the desired combination of physical properties.

Reasonable modification and variation are within the scope of the present invention which is directed to novel curable organopolysiloxane compositions.

That which is claimed is:

1. A curable composition consisting essentially of a mixture of
   a. an organopolysiloxane containing from 75 to 85 mol percent C$_6$H$_5$SiO$_{3/2}$ units and 15 to 25 mol percent CH$_2$=CH(CH$_3$)$_2$SiO$_{1/2}$ units, said organopolysiloxane having an average of at least 8 silicon atoms per molecule;
   b. an organopolysiloxane of the formula

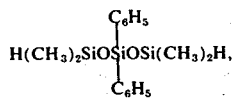

said organopolysiloxane being present in the mixture in an amount sufficient to provide about 0.9 to 1.1 mol of ≡SiH per mol of vinyl substituent present in siloxane (a);
   c. a platinum catalyst present in an amount sufficient to catalyze the addition reaction of ≡SiH with CH$_2$=CHSi≡.

2. A composition in accordance with claim 1 wherein the platinum catalyst (c) is present in an amount sufficient to provide at least 0.1 part by weight platinum per million parts of the combined weight of (a) and (b).

3. A curable composition in accordance with claim 2 wherein the platinum catalyst (c) is present in an amount sufficient to provide from 1 to 20 parts by weight platinum per million parts of the combined weight of (a) and (b).

4. A curable composition in accordance with claim 3 wherein the organopolysiloxane (a) contains about 75 mol percent C$_6$H$_5$SiO$_{3/2}$.

5. A curable composition in accordance with claim 3 wherein organopolysiloxane (b) is present in an amount sufficient to provide about 1.0 mol ≡SiH per mol of vinyl substituent present in (a).

* * * * *